(12) United States Patent
Smith et al.

(10) Patent No.: US 11,697,325 B2
(45) Date of Patent: Jul. 11, 2023

(54) AIR REGISTER ASSEMBLY

(71) Applicant: Ford Global Technologies, LLC, Dearborn, MI (US)

(72) Inventors: George David Koch Smith, Lake Orion, MI (US); Steven Nicholas Fidh, Ann Arbor, MI (US); Brent Clifford Dalton, Dearborn, MI (US); Anthony Michael Esser, Brighton, MI (US); Martin Alfred Lindell, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 17/323,221

(22) Filed: May 18, 2021

(65) Prior Publication Data

US 2022/0371409 A1 Nov. 24, 2022

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .............. B60H 2001/3461; B60H 2001/3471
See application file for complete search history.

(56) References Cited

U.S. PATENT DOCUMENTS

| | | |
|---|---|---|
| 6,059,652 A | 5/2000 | Terry et al. |
| 9,163,848 B2 | 10/2015 | Doll et al. |
| 2016/0052368 A1 * | 2/2016 | Zhang ................ B60H 1/3414 454/154 |
| 2016/0250909 A1 | 9/2016 | Schneider |
| 2017/0253107 A1 | 9/2017 | Castiglioni et al. |
| 2018/0170149 A1 * | 6/2018 | Fidh ..................... B60H 1/3421 |
| 2019/0329630 A1 | 10/2019 | Ren et al. |
| 2022/0314747 A1 * | 10/2022 | Lee ...................... B60H 1/3421 |

FOREIGN PATENT DOCUMENTS

| | | | | |
|---|---|---|---|---|
| CN | 109203920 A | * | 1/2019 | |
| DE | 102006002663 A1 | * | 8/2007 | ........... B60H 1/3421 |
| DE | 102019105121 A1 | | 9/2020 | |
| KR | 19980011700 U | * | 5/1998 | |
| WO | WO-2020109685 A1 | * | 6/2020 | ........... B60H 1/3414 |

* cited by examiner

*Primary Examiner* — Edelmira Bosques
*Assistant Examiner* — Michael James Giordano
(74) *Attorney, Agent, or Firm* — Vichit Chea; Price Heneveld LLP

(57) ABSTRACT

A vehicle air register assembly includes a housing defining a cavity. An upstream portion of the cavity is disposed proximate to an inlet and a downstream portion of the cavity is disposed proximate to an outlet. Vertical vanes are disposed within the upstream portion. The vertical vanes direct air in a horizontal direction. A horizontal vane assembly is disposed within the downstream portion. The horizontal vane assembly directs the air in a vertical direction. The horizontal vane assembly includes at least one horizontal vane including a driver portion rotatably coupled to the housing proximate to the outlet and a follower portion coupled to the housing proximate to the upstream portion. The follower portion is rotatably coupled to the driver portion.

20 Claims, 10 Drawing Sheets

AIR REGISTER ASSEMBLY

FIELD OF THE DISCLOSURE

The present disclosure generally relates to an air register assembly. More specifically, the present disclosure relates to an air register assembly for a vehicle.

BACKGROUND OF THE DISCLOSURE

Vehicles may have a heating, ventilation, and air conditioning system to provide conditioned air to a passenger cabin. The direction of the air may be adjusted by the passenger.

SUMMARY OF THE DISCLOSURE

According to at least one aspect of the present disclosure, an air delivery system for a vehicle includes a housing defining an interior cavity in fluid communication with an inlet and an outlet. The interior cavity includes a first cavity portion and a second cavity portion. A pivoting vane assembly is disposed within the first cavity portion. The pivoting vane assembly includes vanes coupled via a link bar. A linked vane assembly is disposed within the second cavity portion. The linked vane assembly includes a first linked vane having a first driver portion rotatably coupled to a first follower portion and a second linked vane spaced from the first linked vane. The second linked vane includes a second driver portion rotatably coupled to a second follower portion. An actuator is operably coupled to the linked vane assembly to adjust a position of each of the first linked vane and the second linked vane.

According to another aspect of the present disclosure, a vehicle air register assembly includes a housing defining a cavity. An upstream portion of the cavity is disposed proximate to an inlet and a downstream portion of the cavity is disposed proximate to an outlet. Vertical vanes are disposed within the upstream portion. The vertical vanes direct air in a horizontal direction. A horizontal vane assembly is disposed within the downstream portion. The horizontal vane assembly directs the air in a vertical direction. The horizontal vane assembly includes at least one horizontal vane including a driver portion rotatably coupled to the housing proximate to the outlet and a follower portion coupled to the housing proximate to the upstream portion. The follower portion is rotatably coupled to the driver portion.

According to another aspect of the present disclosure, an air register assembly for a vehicle includes a housing defining an interior. The housing defines an inlet and an outlet in fluid communication with the interior. A first linked vane is coupled to the housing. The first linked vane includes a first driver portion rotatably coupled to the housing proximate to the outlet. A first follower portion is rotatably coupled to the first driver portion. A second linked vane is coupled to the housing. The second linked vane includes a second driver portion rotatably coupled to the housing proximate to the outlet and a second follower portion rotatably coupled to the second driver portion. At least one link feature is coupled to the first linked vane and the second linked vane. At least one link feature is adjusted to adjust the first linked vane and the second linked vane to direct airflow through said air register assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
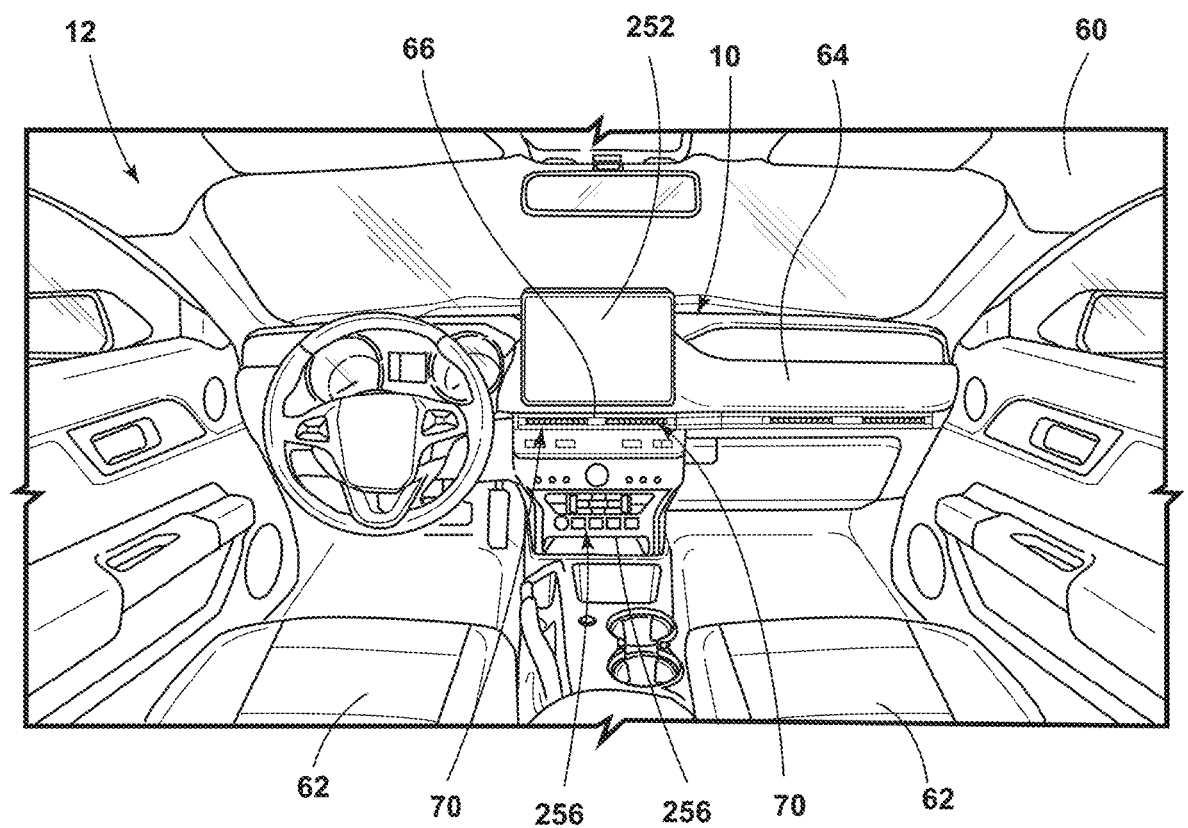
FIG. 1 is a front perspective view of a dashboard with an air delivery system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12, reference numeral 10 generally designates an air delivery system for a vehicle 12 that includes a housing 14 defining an interior cavity 16 in fluid communication with an inlet 18 and an outlet 20. The interior cavity 16 includes a first cavity portion 22 and a second cavity portion 24. A pivoting vane assembly 26 is disposed within the first cavity portion 22. The pivoting vane assembly 26 includes vanes 28 coupled via a link bar 30. A linked vane assembly 32 is disposed within the second cavity portion 24. The linked vane assembly 32 includes a first linked vane 34 that has a first driver portion 36 rotatably coupled to a first follower portion 38. The linked vane assembly 32 also includes a second linked vane 40 spaced from the first linked vane 34. The second linked vane 40 includes a second driver portion 42 rotatably coupled to a second follower portion 44. An actuator 46 is operably coupled to the linked vane assembly 32 to adjust a position of each of the first linked vane 34 and the second linked vane 40.

Referring to FIG. 1, the vehicle 12 includes an interior compartment 60, which includes seating assemblies 62 for supporting passengers thereon. An instrument panel or dashboard 64 extends in a cross-car direction in a vehicle-forward portion of the interior compartment 60 proximate to the seating assembly 62. A bezel 66 is coupled to the dashboard 64 and extends in the cross-car direction. The bezel 66 may extend entirely from one side of the vehicle 12 to the other, or alternatively may extend a portion of the distance between opposing lateral sides of vehicle 12.

The vehicle 12 may be a sedan, a sport utility vehicle, a van, a truck, a crossover, other styles of wheeled motor vehicles 12, or other styles of vehicles 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 may be utilized for personal and/or commercial purposes, such as for ride providing services (e.g., chauffeuring), transporting, and/or ride-sharing services.

Figure 2:
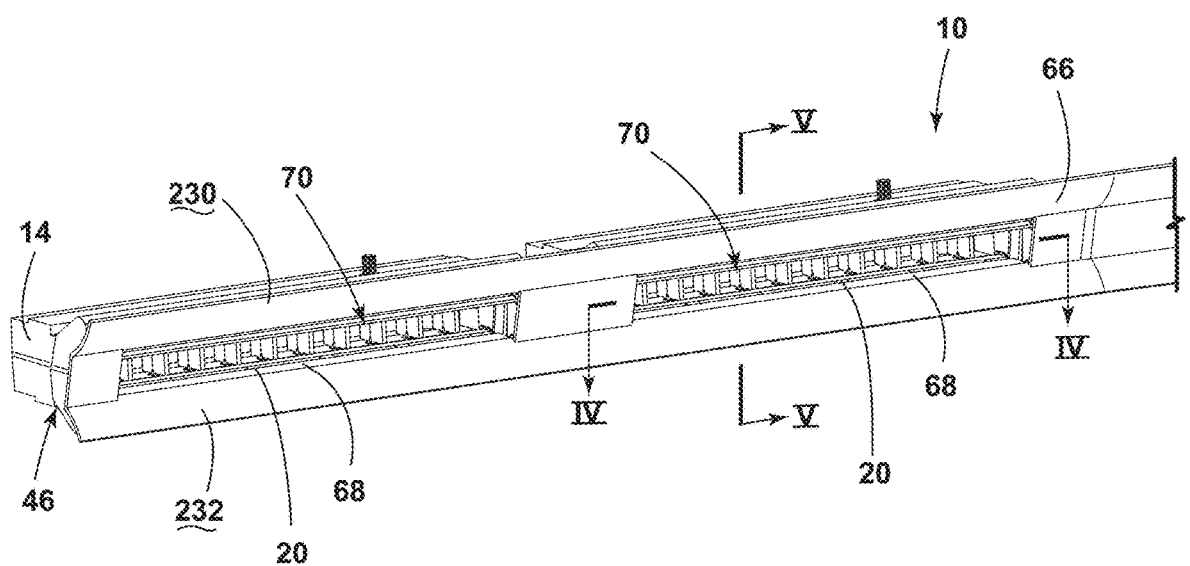
FIG. 2 is a partial side perspective view of an air delivery system having multiple register assemblies aligned with a bezel, according to the present disclosure.

Referring still to FIG. 1, as well as FIG. 2, the bezel 66 defines multiple airflow openings 68 that align with the outlet 20 of multiple air register assemblies 70. The airflow openings 68 fluidly couple the interior compartment 60 with a heating, ventilation, and air conditioning (HVAC) system for the vehicle 12. The air register assemblies 70 direct air from the HVAC system into the interior compartment 60. The HVAC system generally cleans, cools, heats, regulates, ventilates, and/or dehumidifies air directed into the interior compartment 60. The air register assemblies 70 engage ducting 72 (FIG. 5) that extends to the HVAC system. A passenger or user within the vehicle 12 may utilize the air register assemblies 70 to direct the air traveling through the air register assemblies 70 to certain locations or in certain directions to increase the comfort of the passenger.

Figure 3:
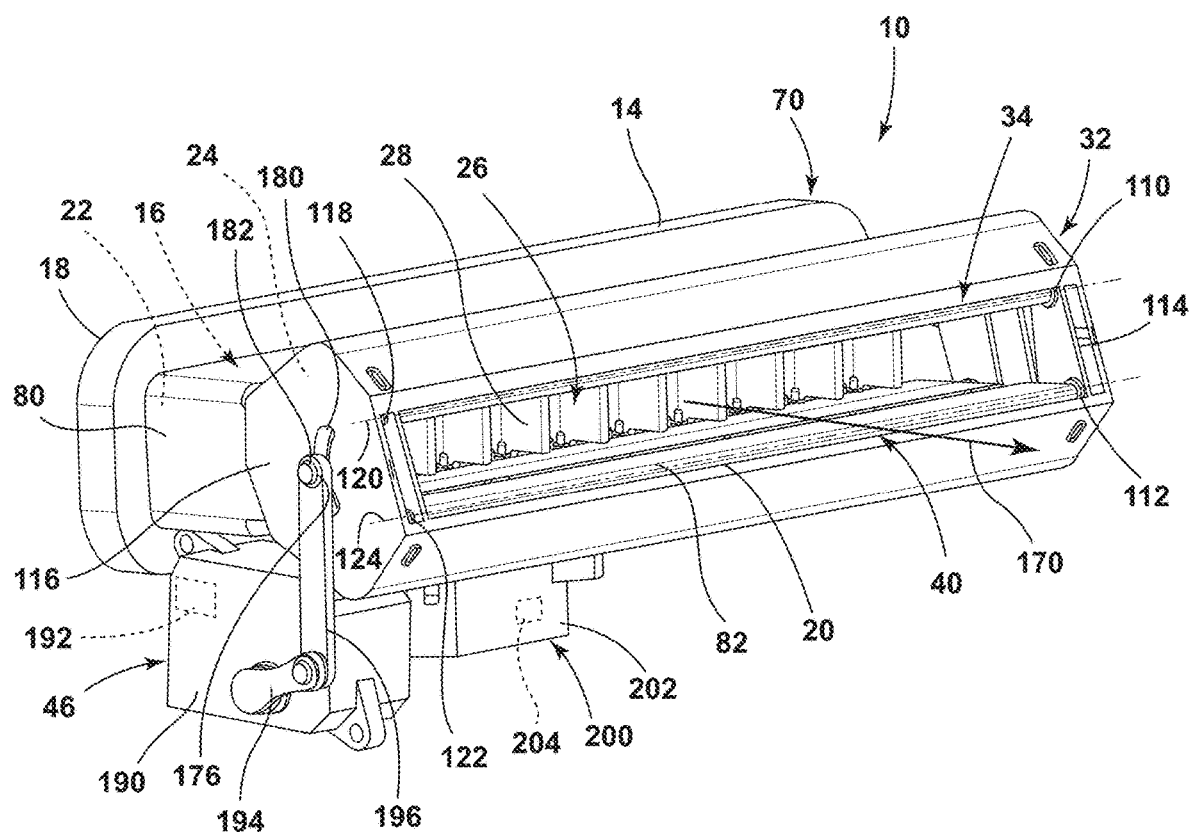
FIG. 3 is a side perspective view of an air register assembly, according to the present disclosure.

Referring still to FIG. 2 as well as FIG. 3, the housing 14 includes an upstream housing portion 80 that defines the first cavity portion 22 and a downstream housing portion 82 that defines the second cavity portion 24. The configuration of the upstream housing portion 80 is generally different from the configuration of the downstream housing portion 82. The configuration of the upstream housing portion 80 accommodates movement of the pivoting vane assembly 26, while the configuration of the downstream housing portion 82 accommodates movement of the linked vane assembly 32. The upstream housing portion 80 defines the inlet 18 and is generally coupled with the ducting 72 (FIG. 5) that fluidly couples the air register assembly 70 with the HVAC system of the vehicle 12. The downstream housing portion 82 defines the outlet 20 which aligns with the respective airflow opening 68 defined by the bezel 66. Accordingly, multiple air register assemblies 70 may be included in the vehicle 12 and aligned with the airflow openings 68 in the bezel 66.

In various examples, the air register assemblies 70 are high aspect ratio air register assemblies 70. In such configurations, the outlet 20 is narrow and elongated, having a width that is at least about 150 mm and a height that is less than about 25 mm. Additionally, the airflow openings 68 defined by the bezel 66 may be narrow, elongated openings that blend with the aesthetics of the dashboard 64. The outlet 20 and the corresponding airflow openings 68 are each generally narrow and elongated.

Figure 4:
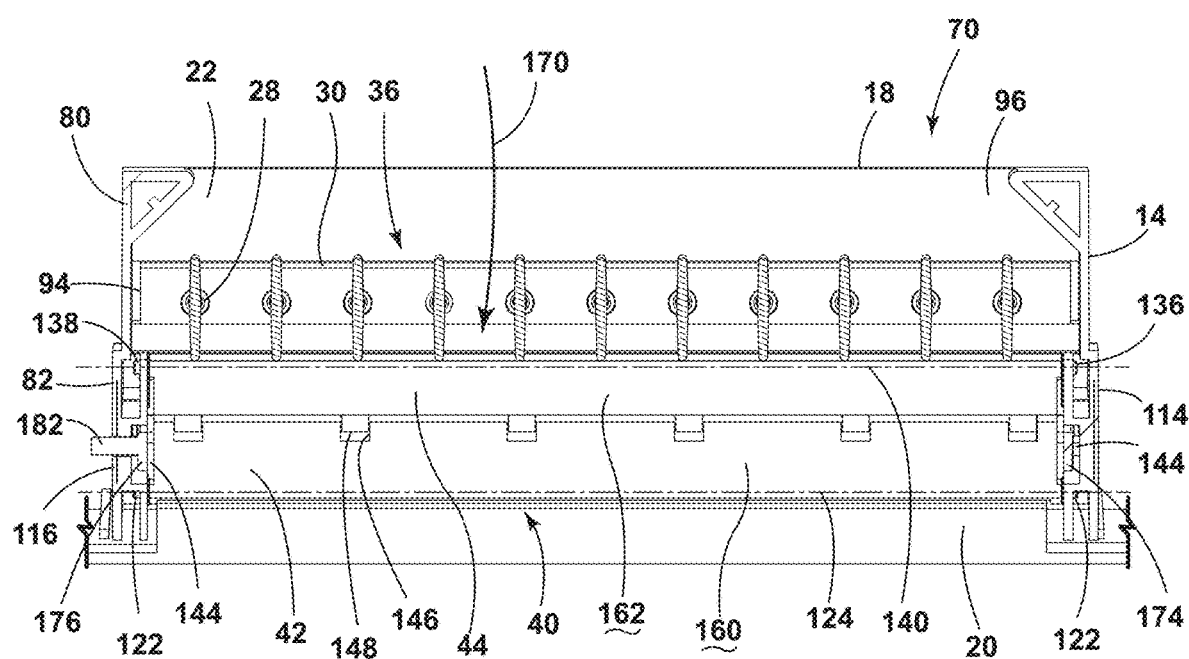
FIG. 4 is a cross-sectional top plan view of the register assembly of FIG. 2, taken along line IV-IV.
Figure 5:
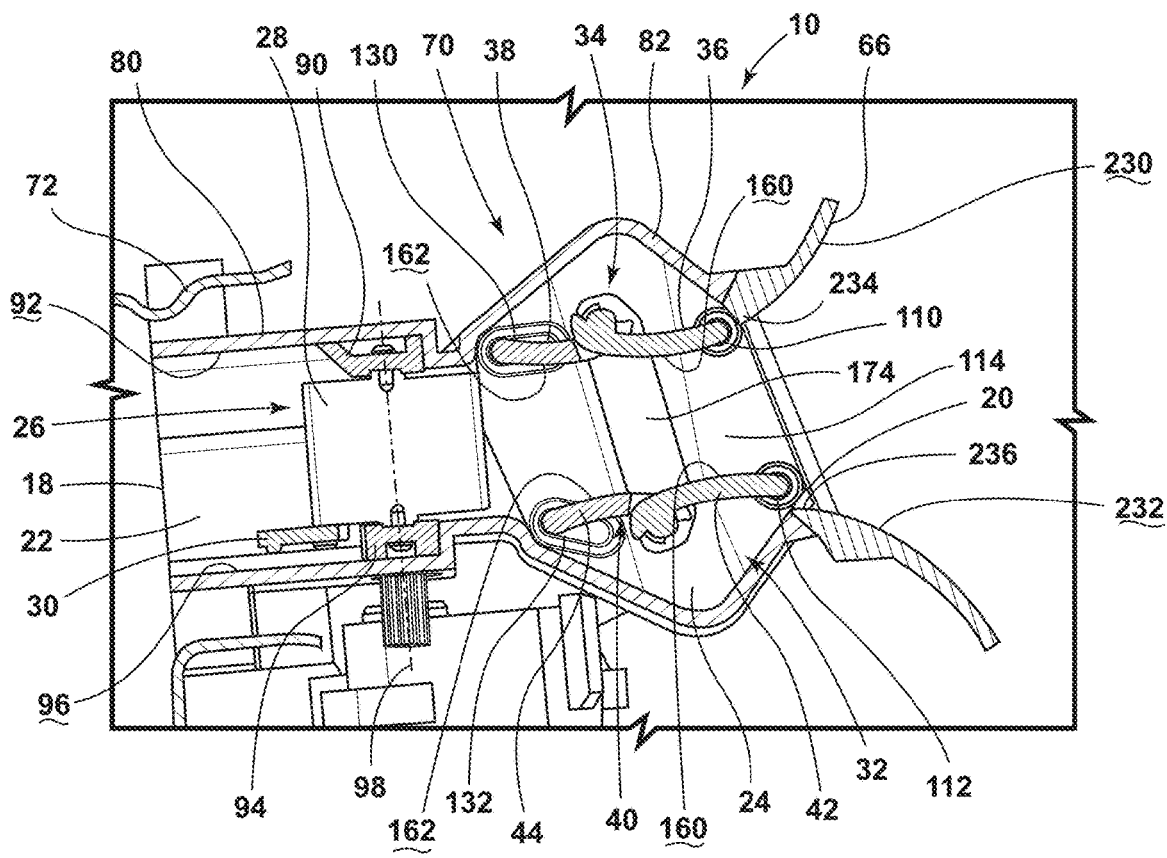
FIG. 5 is a cross-sectional side view of the register assembly of FIG. 2, taken along line V-V.

Referring still to FIG. 3, as well as FIGS. 4 and 5, the air register assembly 70 provides for adjusting airflow in a vertical direction and a horizontal direction. To adjust the airflow in the horizontal direction, the air register assembly 70 includes the pivoting vane assembly 26 with the vanes 28. The vanes 28 are configured as pivoting, vertical vanes disposed within the upstream housing portion 80. The vanes 28 generally extend between an upper bracket 90 coupled to an upper interior surface 92 of the housing 14 and a lower bracket 94 coupled to a lower interior surface 96 of the housing 14. The vanes 28 each pivot or rotate about a respective rotational axis 98, which are generally vertical axes. Each of the vanes 28 is coupled to the link bar 30, which allows the vanes 28 to be rotated simultaneously. As the vanes 28 are rotated, the vanes 28 deflect air traveling through the air register assembly 70 to adjust the airflow horizontally.

The downstream housing portion 82 has a greater height than the upstream housing portion 80 to accommodate movement of the linked vane assembly 32, as described further herein. The upper and lower interior surfaces 92, 96 in the downstream housing portion 82 are generally curved or "V"-shaped. An opening of each "V" faces toward the opposing side of the downstream housing portion 82, creating a greater height within the downstream housing portion 82.

Referring still to FIGS. 3-5, the linked vane assembly 32 includes the first linked vane 34, which is generally an upper horizontal vane, and the second linked vane 40, which is generally a lower horizontal vane. Each of the first and second linked vanes 34, 40 extends from the outlet 20 to the upstream housing portion 80. The first and second linked vanes 34, 40 are generally horizontal vanes that direct air in the vertical direction. Accordingly, the linked vane assembly 32 directs the air in a direction perpendicular to the pivoting vane assembly 26.

The first linked vane 34 includes the first driver portion 36 positioned downstream of the first follower portion 38. Similarly, the second linked vane 40 includes the second driver portion 42 positioned downstream of the second follower portion 44. The driver portions 36, 42 are coupled to the housing 14 proximate to the outlet 20, and the follower portions 38, 44 are coupled to the housing 14 proximate to the first cavity portion 22. The housing 14 defines downstream apertures 110, 112 on each of a first side 114 and a second opposing side 116 thereof. The downstream apertures 110, 112 are disposed proximate to the outlet 20 at different heights for engagement with the first and second linked vanes 34, 40, respectively.

The first driver portion 36 includes pins 118 (FIG. 6) that extend through downstream apertures 110. This engagement allows the first driver portion 36 to rotate about a rotational axis 120. The second driver portion 42 includes pins 122 that extend through the downstream apertures 112, which allows the second driver portion 42 to rotate about a rotational axis 124. The rotational axes 120, 124 are generally horizontal axes and may extend parallel to one another.

The housing 14 also defines upstream slots 130, 132 on each of the first and second sides 114, 116 thereof. The upstream slots 130, 132 accommodate both rotational and sliding movement of the follower portions 38, 44, respectively. The upstream slots 130, 132 may extend at different angles within the housing 14, as illustrated in FIG. 5, based on the movement of the follower portions 38, 44. Alternatively, the upstream slots 130, 132 may extend at the same angle without departing the teachings herein. The length of the upstream slots 130, 132 may depend on the sliding movement of the follower portions 38, 44.

The first follower portion 38 includes pins 134 (FIG. 6) that engage the upstream slots 130. The first follower portion 38 rotates about a rotational axis 136 and slides within the upstream slots 130. The second follower portion 44 includes pins 138 that engage the upstream slots 132. The second follower portion 44 rotates about a rotational axis 140 and slides within the upstream slots 132. Accordingly, each of the follower portions 38, 44 rotates and slides relative to the housing 14 to allow the linked vanes 34, 40 to form the selected shape to direct the airflow vertically.

Figure 6:
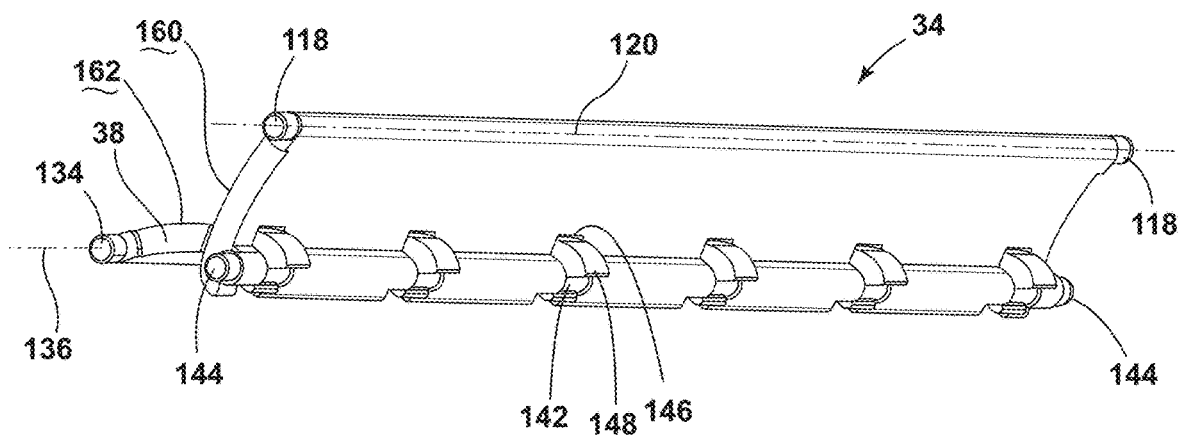
FIG. 6 is a side perspective view of a linked vane removed from an air register assembly, according to the present disclosure.

Referring still to FIGS. 3-5, as well as FIG. 6, the first follower portion 38 is rotatably coupled to the first driver portion 36, and the second follower portion 44 is rotatably coupled to the second driver portion 42. The first linked vane 34 is illustrated in FIG. 6 and will be described in detail herein. The second linked vane 40, illustrated in FIG. 4, is generally constructed and functions the same as the first linked vane 34. Each of the first driver portion 36 and the first follower portion 38 include pins 118, 134 for rotatably engaging the housing 14. The pins 118, 134 are on distal ends of the first driver portion 36 and the first follower portion 38, respectively. Proximal ends of the first driver portion 36 and the first follower portion 38 are rotatably coupled to one another.

The first driver portion 36 has coupling bars 142 on the proximal end and drive pins 144 extending from each side of the first driver portion 36 on the proximal end. Additionally, the first driver portion 36 defines a receiving aperture 146 proximate to each coupling bar 142. The first follower portion 38 includes coupling features 148 that extend through the receiving apertures 146 and couple to the coupling bars 142. In certain aspects, the coupling features 148 snap engage the coupling bars 142. The coupling features 148 are configured to rotate about the coupling bars 142, providing a hinged engagement. Movement of the driver portion 36 causes complimentary movement of the follower portion 38 through the hinged engagement.

Referring still to FIGS. 3-6, each of the first driver portion 36, the first follower portion 38, the second driver portion 42, and the second follower portion 44 defines an arcuate shape. The driver portions 36, 42 have curved guide surfaces 160 oriented toward one another, and the follower portions 38, 44 have curved guide surfaces 162 oriented toward one another. The first linked vane 34 and the second linked vane 40 are arranged on upper and lower sides of an airflow path 170 extending through the air register assembly 70. The curved guide surfaces 160, 162 operate to guide the airflow path 170 in the vertical direction with the movement of the linked vane assembly 32.

Referring again to FIGS. 3-5, the first linked vane 34 and the second linked vane 40 are each coupled to link features 174, 176. In certain aspects, the driver portions 36, 42 are coupled to the link features 174, 176. In this way, the first linked vane 34 is coupled to the second linked vane 40 via the link features 174, 176, allowing for simultaneous or concurrent movement of the linked vanes 34, 42. The link feature 174 is disposed proximate to the first side 114 of the housing 14 and coupled to a first side of the linked vanes 34, 42, and the link feature 176 is disposed proximate to the second side 116 of the housing 14 and coupled to a second side of the linked vanes 34, 42. The link features 174, 176 are configured to adjust vertically within the housing 14. The link features 174, 176 allow the linked vanes 34, 40 to be adjusted simultaneously. The use of two linked features 174, 176 arranged on opposing sides of the linked vanes 34, 40 minimizes or prevents twisting or binding as the linked vanes 34, 40 are moved. The drive pins 144 on each of the driver portions 36, 42 are coupled to the link features 174, 176. In this way, the linked vanes 34, 40 are coupled to the linked features 174, 176 proximate to the hinged engagement.

The second side 116 of the housing 14 defines a slot 180, and the link feature 176 includes an engagement pin 182 that extends through the slot 180 to engage the actuator 46. While the air register assembly 70 includes two linked features 174, 176, the link feature 176 may engage the actuator 46 while the link feature 174 does not. The actuator 46 engages the engagement pin 182 to adjust the engagement pin 182 along the slot 180 vertically adjusting the link feature 176, which consequently causes movement of the driver portions 36, 42 from a single side of the air register assembly 70. The movement of the driver portions 36, 42 causes movement of the follower portions 38, 44 through the hinged engagement between the driver portions 36, 42 and the follower portions 38, 44. Further, the linked vanes 34, 40 are driven from a location proximate to the hinged engagement.

As illustrated in FIG. 3, the actuator 46 coupled to the linked vane assembly 32 includes a motor 190 having or operably coupled with a position sensor 192. Two links 194, 196 extend between the motor 190 and the engagement pin 182 of the link feature 176. When the motor 190 is activated, the motor 190 adjusts the link 194 and, consequently, adjusts the link 196 to adjust the position of the engagement pin 182 relative to the slot 180. The position sensor 192 monitors the position of the linked vanes 34, 40, allowing the linked vane assembly 32 to be adjusted to the selected position to provide the selected vertical direction of the airflow path 170.

The air register assembly 70 generally includes a second actuator 200 that engages the pivoting vane assembly 26. The second actuator 200 also includes a motor 202 operably coupled to at least one of the vanes 28 and the link bar 30. The motor 202 also includes or is operably coupled with a position sensor 204 to be able to adjust the vanes 28 to a selected position, thereby providing the selected horizontal direction of the airflow path 170. Each of the pivoting vane assembly 26 and the linked vane assembly 32 may automatically be adjusted to direct the airflow path 170 both horizontally and vertically.

Figure 7:
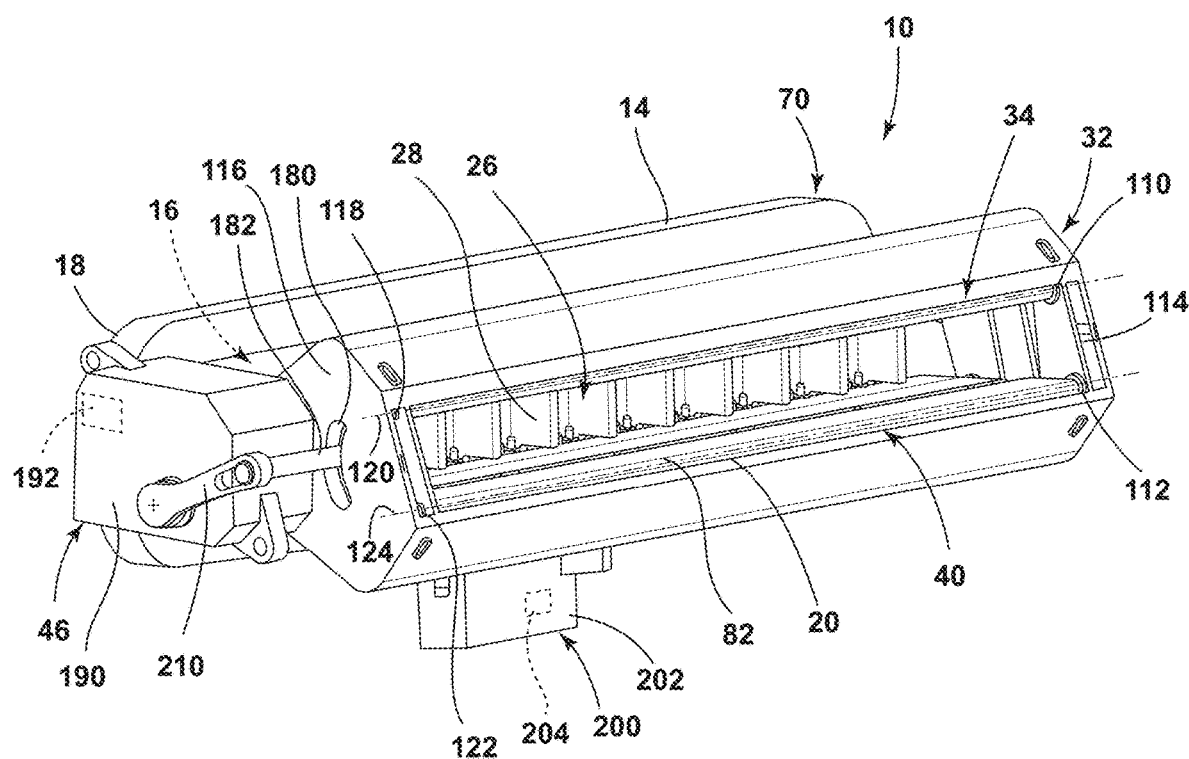
FIG. 7 is a side perspective view of an air register assembly having actuators with motors, according to the present disclosure.

Referring to FIG. 7, in additional or alternative configurations, the actuator 46 coupled to the linked vane assembly 32 may include the motor 190 and a cam 210. The motor 190 may be positioned vertically higher than the configuration illustrated in FIG. 3, with the motor 190 horizontally aligned with the slot 180. The cam 210 engages the engagement pin 182. The motor 190 rotates the cam 210, which adjusts the position of the engagement pin 182 in the slot 180, consequently driving the motion of the linked vane assembly 32. This configuration of the actuator 46 removes a component compared to the configuration illustrated in FIG. 3.

Figure 8:
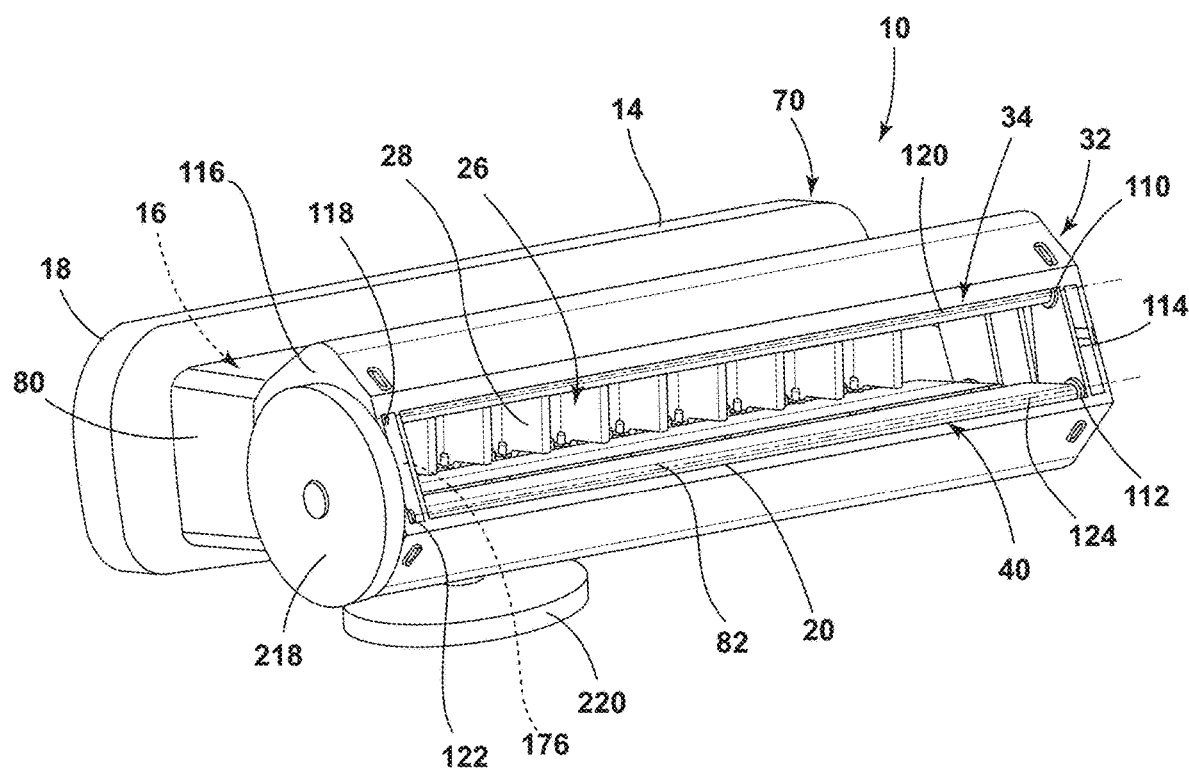
FIG. 8 is a side perspective view of an air register assembly having control knobs for manual adjustment, according to the present disclosure.

Referring to FIG. 8, in additional or alternative configurations, the air register assemblies 70 may be manually adjustable. In such configurations, the air register assembly 70 includes a first control knob 218 (e.g., the actuator 46) proximate to the second side 116 of the housing 14 that engages the link feature 176, and a second control knob 220 (e.g., the actuator 200) disposed below the housing 14 that engages the pivoting vane assembly 26. A user may adjust (e.g., rotate, slide, etc.) the control knobs 218, 220 to adjust the position of the linked vane assembly 32 and the pivoting vane assembly 26, respectively. The control knobs 218, 220 may extend through the bezel 66 (FIG. 2), through the dashboard 64 (FIG. 1), or between the bezel 66 and dashboard 64 to be engaged by the passenger.

Figure 9:
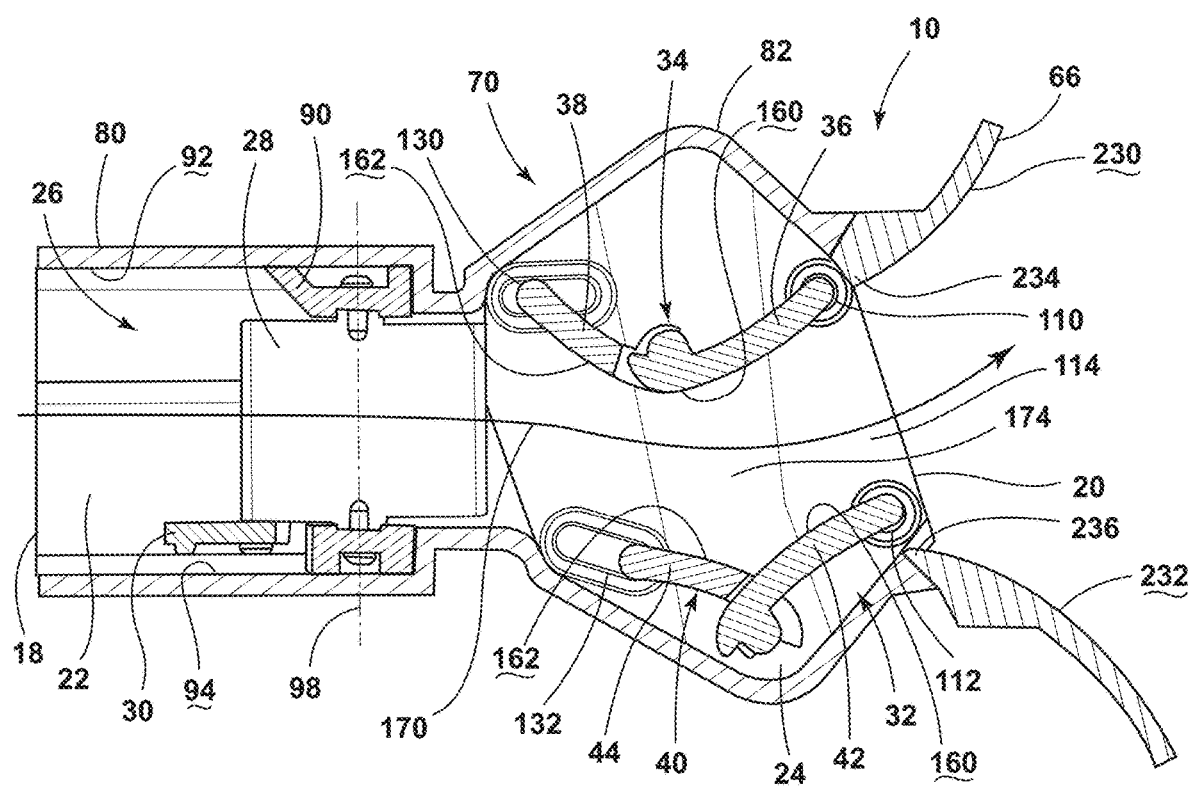
FIG. 9 is a cross-sectional side view of an air register assembly guiding air upwards when exiting the air register assembly relative to an entry direction, according to the present disclosure.
Figure 10:
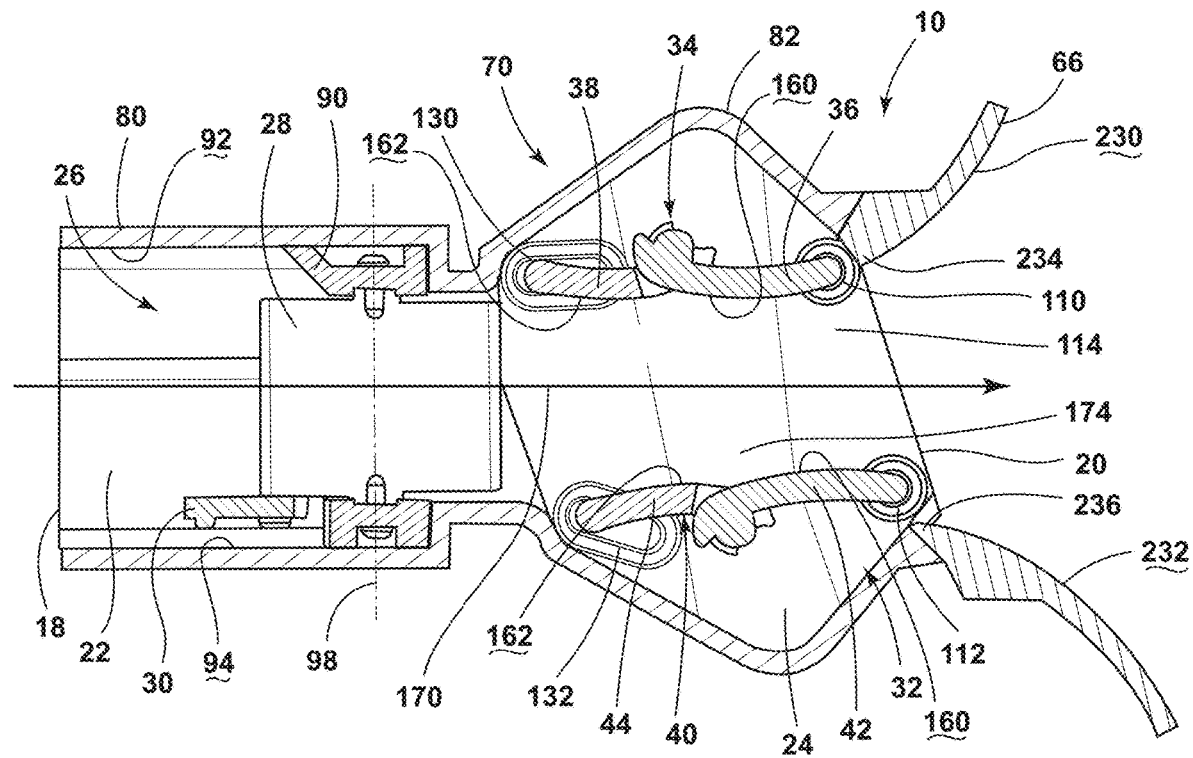
FIG. 10 is a cross-sectional side view of an air register assembly guiding air generally straight when exiting the air register assembly relative to an entry direction, according to the present disclosure.
Figure 11:
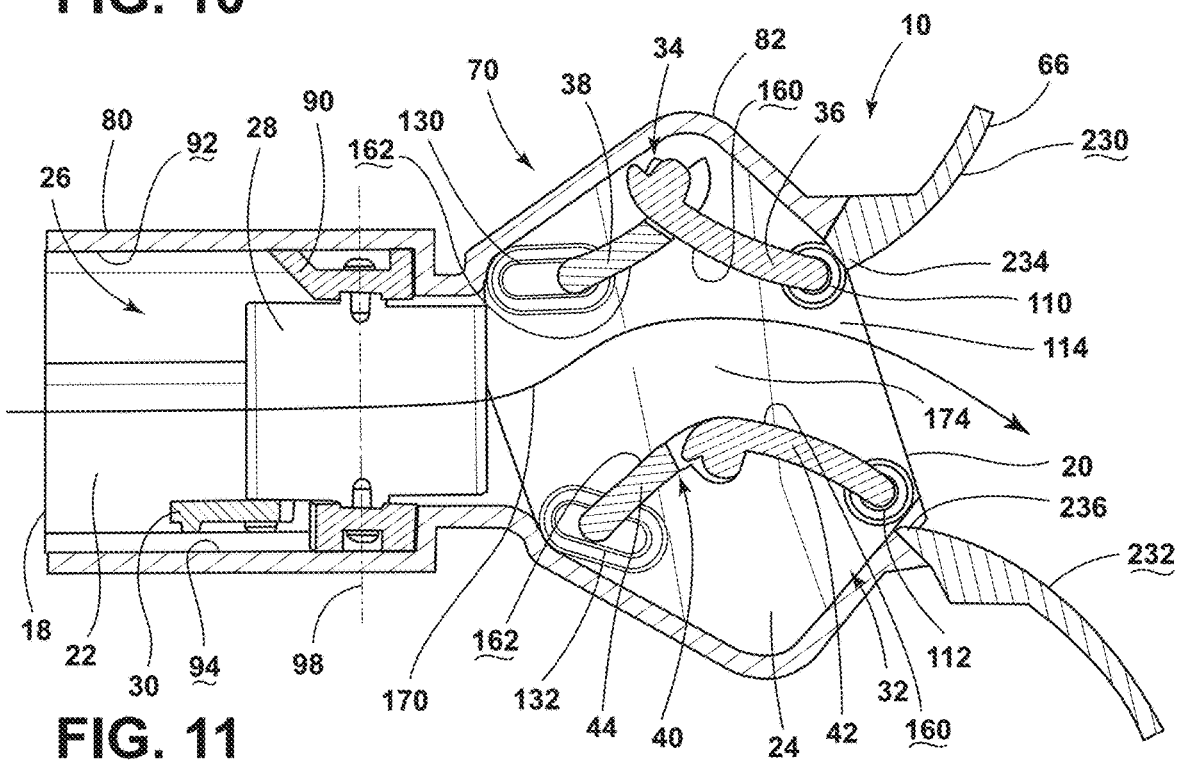
FIG. 11 is a cross-sectional side view of an air register assembly guiding air downwards when exiting the air register assembly relative to an entry direction, according to the present disclosure.

Referring to FIGS. 9-11, as previously stated, the linked vane assembly 32 adjusts the airflow path 170 in the vertical direction. The linked vane assembly 32 may not deflect the air like the pivoting vane assembly 26 but may operate as a nozzle that directs the airflow based on the position of the linked vane assembly 32 and the curved guide surfaces 160, 162. The curved guide surfaces 160, 162 guide the airflow in a selected direction using the Bernoulli Principle and the Coanda Effect. Generally, airflow along the curved guide surfaces 160, 162 creates low pressure causing the air to entrain or adhere to the linked vane assembly 32. Accordingly, the lower pressure allows the linked vane assembly 32 to direct or guide the airflow in the selected vertical direction by taking advantage of the Coanda Effect.

Each of the first linked vane 34 and the second linked vane 40 is coupled to the housing 14 at opposing ends with the hinged engagement therebetween. One end proximate to the outlet 20 is generally fixed relative to the outlet 20, while the opposing end slides between different positions. The hinged engagement allows the driver portions 36, 42 to rotate and the follower portions 38, 44 to slide and rotate. Additionally, the hinged engagement allows the linked vanes 34, 40 to slide and fold, thereby adjusting a curvature of the linked vanes 34, 40, respectively. The linked vanes 34, 40 may operate as a two-dimensional nozzle that extends along the outlet 20.

The first linked vane 34 and the second linked vane 40 are configured to adjust between a concave shape and a convex shape relative to an airflow path 170 that extends therebetween. When the first linked vane 34 is in the convex shape, the second linked vane 40 is in the concave shape and vice versa. The range of movement is defined by the linked vane 34, 40 that is moving to the convex shape. When the curved guide surface 160 abuts the curved surface 162, the linked vane assembly 32 may be prevented or hindered from moving further in the direction for forming the convex shape.

As illustrated in FIG. 9, the first linked vane 34 defines the convex shape while the second linked vane 40 defines the concave shape relative to the airflow path 170. The airflow traveling through the air register assembly 70 entrains to the curved guide surfaces 160, 162. Based on the configuration of the linked vanes 34, 40 and the curved guide surfaces 160, 162, the linked vane assembly 32 guides the airflow upwards when exiting the outlet 20 relative to the airflow path 170 entering the inlet 18.

Referring to FIG. 10, the linked vanes 34, 40 are illustrated in a more linear configuration within the housing 14. Neither of the linked vanes 34, 40 defines a substantially convex nor concave shape. Without the convex and concave shapes, the curved guide surfaces 160, 162 direct or guide the airflow path 170 in a vertical line from the inlet 18 through the outlet 20.

As illustrated in FIG. 11, the first linked vane 34 defines the convex shape while the second linked vane 40 defines the concave shape. In this configuration, the orientation of the linked vane assembly 32 guides the airflow path 170 downward as the airflow exits the air register assembly 70. The airflow path 170 is generally linear as the airflow enters the air register assembly 70 through the inlet 18 and is guided vertically downward by the linked vane assembly 32 as the airflow is expelled through the outlet 20. It is contemplated that the linked vane assembly 32 may direct the airflow path 170 at any vertical position, including those between the illustrated configurations of FIGS. 9 and 11. Moreover, the airflow path 170 is adjusted horizontally by the pivoting vane assembly 26 prior to being adjusted vertically by the linked vane assembly 32.

Referring still to FIGS. 9-11, the bezel 66 includes upper and lower curved surfaces 230, 232 on opposing sides of the outlet 20. Generally, the curved surfaces 230, 232 are upper and lower surfaces, respectively, which may also take advantage of the Coanda Effect for assisting in directing the airflow path 170 as the airflow exits the air register assembly 70. The curved surface 230 assists when the airflow is directed vertically upwards, as illustrated in FIG. 9, and the curved surface 232 assists when the airflow is directed vertically downward, as illustrated in FIG. 11. The lower pressure caused by the curved surfaces 230, 232 allows the airflow to entrain or adhere to the bezel 66 to augment the turning of the air in the vertical direction as the air is expelled through the outlet 20.

Referring to FIGS. 1-11, the configuration of the air register assembly 70 may affect the function or aesthetics of the air register assembly 70. In a non-limiting example, the outlet 20 may have a height $h_1$ less than about 25 mm and a width w less than about 150 mm. In such configurations, the airflow opening 68 of the bezel 66 may have a height $h_2$ in a range from about 12 mm to about 25 mm. The bezel 66 has a first edge 234 that defines an upper edge of the airflow opening 68 and a second edge 236 that defines a lower edge of the airflow opening 68. The edges 234, 236 may be positioned relative to the linked vane assembly 32 to at least partially obscure the linked vanes 34, 40 from the view of the passengers in the interior compartment 60. The edges 234, 236 may be aligned with a center of the driver portions 36, 42 where the driver portions 36, 42 are coupled to the housing 14. A distance $d_1$ between the curved guide surfaces 160 and the edges 234, 236, respectively, may be about half a thickness t of the driver portions 36, 42 or less.

Additionally or alternatively, each of the driver portions 36, 42 and the follower portions 38, 44 has a length l in a range from about 10 mm to about 20 mm. Each of the driver portions 36, 42 and the follower portions 38, 44 may also have a radius or curvature along the curved guide surfaces 160, 162, respectively, in a range from about 25 mm to about 50 mm. Further, an orientation or position of the hinged engagement may be a distance $d_2$ in a range from about 3 mm to about 8 mm from the distal ends of the driver portions 36, 42 and the follower portions 38, 44, respectively. The distance $d_2$ may be measured along the curved guide surfaces 160, 162 These measurements and configurations are merely exemplary and not meant to be limiting.

Figure 12:
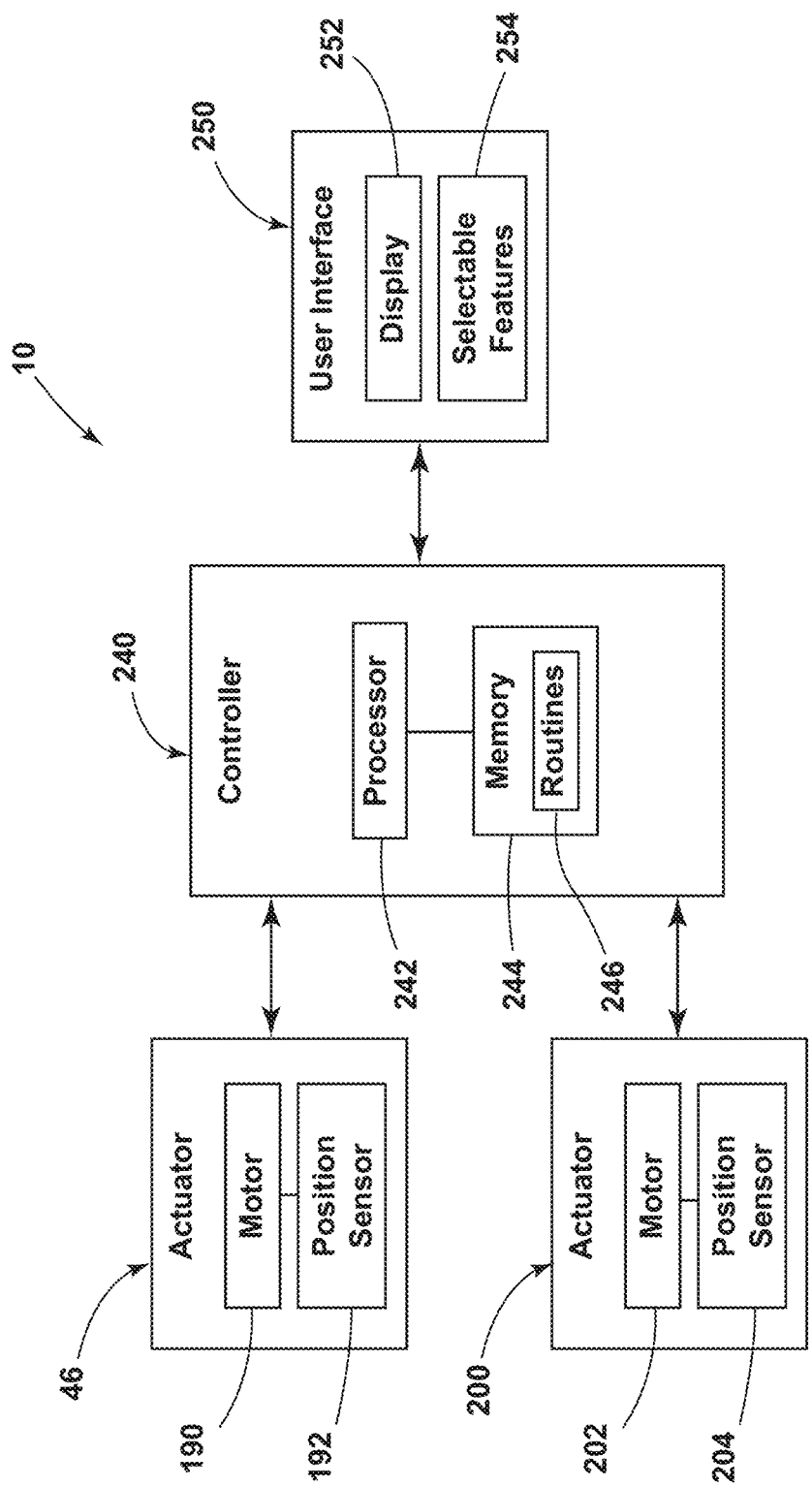
FIG. 12 is a block diagram of an air delivery system for a vehicle, according to the present disclosure.

Referring to FIG. 12, the air delivery system 10 includes a controller 240 that has a processor 242, a memory 244, and other control circuitry. Instructions or routines 246 are stored in the memory 244 and executable by the processor 242. The controller 240 is in communication with a user interface 250, which may include a display 252 or other selectable feature 254 (e.g., buttons, switches, knobs, etc.), such as those on a center stack 256 in the vehicle 12 (FIG. 1). The passenger or user may input a selection into the user interface 250 regarding the horizontal and vertical direction of the airflow expelled from the air register assemblies 70. The input is communicated to the controller 240, which may then activate one or both of the motors 190, 202.

The controller 240 may include at least one routine 246 to determine the current position of the pivoting vane assembly 26 and the linked vane assembly 32 from the position sensors 192, 204. If the current position does not match the position for the selected airflow path 170, the controller 240 adjusts the linked vane assembly 32 or the pivoting vane assembly 26 via the actuators 46, 200. The controller 240 may continue to monitor the position of the pivoting vane assembly 26 and the linked vane assembly 32 until the position corresponds with the selected airflow path 170. The controller 240 may store position information that correlates the position of the pivoting vane assembly 26 with horizontal directions and the linked vane assembly 32 with vertical directions.

Referring to FIGS. 1-11, the air register assembly 70 receives conditioned air from the HVAC assembly via the ducting 72. The air travels through the inlet 18 and through the first cavity portion 22. The air is then deflected horizontally by the vanes 28 of the pivoting vane assembly 26. After being defected horizontally, the air travels into the second cavity portion 24. The air follows the curved guide surfaces 160, 162 and is guided vertically based on the position of the linked vane assembly 32. The air is then expelled through the outlet 20. Depending on the vertical orientation of the airflow path 170 exiting the air register assembly 70, the air follows the curved surfaces 230, 232 of the bezel 66. The air is directed to the selected horizontal and vertical direction and into the interior compartment 60. Based on the positions of the pivoting vane assembly 26 and the linked vane assembly 32, the air may exit the air register assembly 70 at a different vertical and/or horizontal angle relative to an entry direction at the inlet 18.

Use of the present device and system may provide for a variety of advantages. For example, the linked vane assembly 32 may be substantially obscured by the bezel 66, thereby increasing the aesthetics of the air delivery system 10. Additionally, the air registers assemblies 70 may be high aspect ratio registers, which minimizes the appearance of the outlets 20 and corresponding airflow openings 68 in the dashboard 64. Additionally, the linked vane assembly 32 may operate as a two-dimensional nozzle to direct the airflow along the vertical direction, while the pivoting vane assembly 26 deflects air along the horizontal direction. Also, the linked vane assembly 32 may take advantage of the Coanda Effect to direct air in the selected direction when expelling the air from the outlet 20. Moreover, the linked vane assembly 32 and the pivoting vane assembly 26 may be automatically adjusted by the actuators 46, 200 or manually adjusted through the control knobs 218, 220. Moreover, the first linked vane 34 may be coupled to the second linked vane 40 via the link features 174, 176, which may minimize or prevent twisting or binding of the linked vane assembly 32 during movement of the linked vanes 34, 40. Further, the driver portion 36, 42 engage the link feature 176 and are rotatably coupled to the respective follower portion 38, 44. Accordingly, the driver portions 36, 42 are adjusted by the link feature 176 and cause the sliding and rotational movement of the follower portions 38, 44. Additional benefits or the images may be realized and/or achieved.

According to various examples, an air delivery system for a vehicle includes a housing defining an interior cavity in fluid communication with an inlet and an outlet. The interior cavity includes a first cavity portion and a second cavity portion. A pivoting vane assembly is disposed within the first cavity portion. The pivoting vane assembly includes vanes coupled via a link bar. A linked vane assembly is disposed within the second cavity portion. The linked vane assembly includes a first linked vane having a first driver portion rotatably coupled to a first follower portion and a second linked vane spaced from the first linked vane. The second linked vane includes a second driver portion rotatably coupled to a second follower portion. An actuator is operably coupled to the linked vane assembly to adjust a position of each of the first linked vane and the second linked vane. Embodiments of the present disclosure may include one or a combination of the following features:

- a link feature coupled to each of the first driver portion, the second driver portion, and the actuator, wherein the first linked vane and the second linked vane are adjusted concurrently by the actuator;
- the link feature extends through the housing to engage the actuator;
- a bezel coupled to the housing proximate to the outlet, wherein the bezel has an upper curved surface and a lower curved surface to assist in directing airflow exiting the housing;
- the bezel includes a first edge and a second edge defining an airflow opening, wherein the first edge is disposed proximate to an end of the first linked vane that is coupled to the housing and the second edge is disposed proximate to an end of the second linked vane that is coupled to the housing to at least partially obscure the linked vane assembly;
- each pivoting vane rotates to direct air in a horizontal direction, wherein the linked vane assembly is adjusted to direct airflow in a vertical direction; and
- the pivoting vane assembly adjusts airflow in a horizontal direction and the linked vane assembly adjusts the airflow in a vertical direction.

According to various examples, a vehicle air register assembly includes a housing defining a cavity. An upstream portion of the cavity is disposed proximate to an inlet and a downstream portion of the cavity is disposed proximate to an outlet. Vertical vanes are disposed within the upstream portion. The vertical vanes direct air in a horizontal direction. A horizontal vane assembly is disposed within the downstream portion. The horizontal vane assembly directs the air in a vertical direction. The horizontal vane assembly includes at least one horizontal vane including a driver portion rotatably coupled to the housing proximate to the outlet and a follower portion coupled to the housing proximate to the upstream portion. The follower portion is rotatably coupled to the driver portion. Embodiments of the present disclosure may include one or a combination of the following features:

- the driver portion defines apertures and the follower portion defines coupling features, wherein the coupling features extend through the apertures to snap engage the driver portion;
- the housing defines a slot, wherein the follower portion is slidably adjusted along the slot as the follower portion is rotated;
- the at least one horizontal vane includes an upper horizontal vane and a lower horizontal vane;
- the driver portion of the upper horizontal vane is coupled to the driver portion of the lower horizontal vane via a link feature;
- each of the driver portion and the follower portion is arcuate;
- a first actuator operably coupled to the vertical vanes to adjust a position of the vertical vanes, and a second actuator operably coupled to the horizontal vane assembly to adjust a position of the horizontal vane assembly; and
- each of the first actuator and the second actuator include a motor and a position sensor.

According to various examples, an air register assembly for a vehicle includes a housing defining an interior. The housing defines an inlet and an outlet in fluid communication with the interior. A first linked vane is coupled to the housing. The first linked vane includes a first driver portion rotatably coupled to the housing proximate to the outlet. A first follower portion is rotatably coupled to the first driver portion. A second linked vane is coupled to the housing. The second linked vane includes a second driver portion rotatably coupled to the housing proximate to the outlet and a second follower portion is rotatably coupled to the second driver portion. At least one link feature is coupled to the first linked vane and the second linked vane. The at least one link feature is adjusted to adjust the first linked vane and the second linked vane to direct airflow through said air register assembly. Embodiments of the present disclosure may include one or a combination of the following features:

- a pivoting vane assembly coupled to the housing, wherein the pivoting vane assembly directs the airflow in a direction perpendicular to the first linked vane and the second linked vane;
- the at least one link feature includes a first link feature coupled to a first side of the first linked vane and the second linked vane and a second link feature coupled to a second side of the first linked vane and the second linked vane;
- the at least one link feature is coupled to the first driver portion and the second driver portion proximate to a hinged engagement of each of the first linked vane and the second linked vane; and
- the air register is a high aspect register having the outlet with a width that is at least 150 mm and a height that is less than 25 mm.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine, or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An air delivery system for a vehicle, comprising:
    a housing defining an interior cavity in fluid communication with an inlet and an outlet, wherein the interior cavity includes a first cavity portion and a second cavity portion;
    a pivoting vane assembly disposed within the first cavity portion, wherein the pivoting vane assembly includes vanes coupled via a link bar;
    a linked vane assembly disposed within the second cavity portion, wherein the linked vane assembly includes:
        a first linked vane having a first driver portion rotatably coupled to a first follower portion, each of the first driver portion and the first follower portion having a convex surface and a concave surface; and
        a second linked vane spaced from the first linked vane, wherein the second linked vane includes a second driver portion rotatably coupled to a second follower portion, each of the second driver portion and the second follower portion having a convex surface and a concave surface, wherein the convex surfaces of the first linked vane are oriented toward the convex surfaces of the second linked vane and the convex surfaces of the second linked vane are oriented toward the convex surfaces of the first linked vane; and
    an actuator operably coupled to the linked vane assembly to adjust a position of each of the first linked vane and the second linked vane.

2. The air delivery system of claim 1, further comprising:
    a link feature coupled to each of the first driver portion, the second driver portion, and the actuator, wherein the first linked vane and the second linked vane are adjusted concurrently by the actuator.

3. The air delivery system of claim 2, wherein the link feature extends through the housing to engage the actuator.

4. The air delivery system of claim 1, further comprising:
    a bezel coupled to the housing proximate to the outlet, wherein the bezel has an upper curved surface and a lower curved surface to assist in directing airflow exiting the housing.

5. The air delivery system of claim 4, wherein the bezel includes a first edge and a second edge defining an airflow opening, wherein the first edge is disposed proximate to an end of the first linked vane that is coupled to the housing and the second edge is disposed proximate to an end of the second linked vane that is coupled to the housing to at least partially obscure the linked vane assembly.

6. The air delivery system of claim 1, wherein each pivoting vane rotates to direct air in a horizontal direction, and wherein the linked vane assembly is adjusted to direct airflow in a vertical direction.

7. The air delivery system of claim 1, wherein the pivoting vane assembly adjusts airflow in a horizontal direction and the linked vane assembly adjusts the airflow in a vertical direction.

8. A vehicle air register assembly, comprising:
    a housing defining a cavity, wherein an upstream portion of the cavity is disposed proximate to an inlet and a downstream portion of the cavity is disposed proximate to an outlet;
    vertical vanes disposed within the upstream portion, wherein the vertical vanes direct air in a horizontal direction; and
    a horizontal vane assembly disposed within the downstream portion, wherein the horizontal vane assembly directs the air in a vertical direction, wherein the horizontal vane assembly includes a first horizontal vane and a second horizontal vane each including:
        a driver portion rotatably coupled to the housing proximate to the outlet, the driver portion having a convex surface and a concave surface; and
        a follower portion coupled to the housing proximate to the upstream portion, the follower portion having a convex surface and a concave surface, wherein the follower portion is rotatably coupled to the driver portion, and wherein the convex surfaces of the driver portion and the follower portion of the first horizontal vane are each oriented toward the second horizontal vane.

9. The vehicle air register assembly of claim 8, wherein the driver portion defines apertures and the follower portion defines coupling features, and wherein the coupling features extend through the apertures to snap engage the driver portion.

10. The vehicle air register assembly of claim 8, wherein the housing defines a slot, and wherein the follower portion is slidably adjusted along the slot as the follower portion is rotated.

11. The vehicle air register assembly of claim 8, wherein the driver portion of the first horizontal vane is coupled to the driver portion of the second horizontal vane via a link feature.

12. The vehicle air register assembly of claim 8, further comprising:
    a first actuator operably coupled to the vertical vanes to adjust a position of the vertical vanes; and
    a second actuator operably coupled to the horizontal vane assembly to adjust a position of the horizontal vane assembly.

13. The vehicle air register assembly of claim 12, wherein each of the first actuator and the second actuator include a motor and a position sensor.

14. An air register assembly for a vehicle, comprising:
- a housing defining an interior, wherein the housing defines an inlet and an outlet in fluid communication with the interior;
- a first linked vane coupled to the housing, wherein the first linked vane includes:
  - a first driver portion rotatably coupled to the housing proximate to the outlet; and
  - a first follower portion rotatably coupled to the first driver portion;
- a second linked vane coupled to the housing, wherein the second linked vane includes:
  - a second driver portion rotatably coupled to the housing proximate to the outlet; and
  - a second follower portion rotatably coupled to the second driver portion, wherein the first driver portion and the first follower portion are convex relative to the second driver portion and the second follower portion, and wherein the second driver portion and the second follower portion are convex relative to the first driver portion and the first follower portion; and
- at least one link feature coupled to the first linked vane and the second linked vane, wherein the at least one link feature is adjusted to adjust the first linked vane and the second linked vane to direct airflow through said air register assembly.

15. The air register assembly of claim 14, further comprising:
- a pivoting vane assembly coupled to the housing, wherein the pivoting vane assembly directs the airflow in a direction perpendicular to the first linked vane and the second linked vane.

16. The air register assembly of claim 14, wherein the at least one link feature includes a first link feature coupled to a first side of the first linked vane and the second linked vane and a second link feature coupled to a second side of the first linked vane and the second linked vane.

17. The air register assembly of claim 14, wherein the at least one link feature is coupled to the first driver portion and the second driver portion proximate to a hinged engagement of each of the first linked vane and the second linked vane.

18. The air register assembly of claim 14, wherein said air register is a high aspect register having the outlet with a width that is at least 150 mm and a height that is less than 25 mm.

19. The air delivery system of claim 1, wherein the first driver portion and second driver portion are snap coupled with the first follower portion and second follower portion, respectively, via multiple coupling bars, and wherein a first of the multiple coupling bars is disposed on the first driver portion proximate to a first side of the housing, a second of the multiple coupling bars is disposed on the first driver portion proximate to a second side of the housing, and a third of the multiple coupling bars is disposed on the first driver portion between the first and second of the multiple coupling bars.

20. The vehicle air register assembly of claim 8, wherein the convex surfaces of the driver portion and the follower portion of the second horizontal vane are each oriented toward the first horizontal vane.

* * * * *